(12) United States Patent
Dubbs et al.

(10) Patent No.: US 7,398,805 B2
(45) Date of Patent: Jul. 15, 2008

(54) SELF-PROPELLED/TOW-BEHIND, VARIABLE WIDTH STUMP CUTTING MACHINE

(76) Inventors: Donald William Dubbs, c/o Neil Dubbs-P.O. Box 2084, Tarpon Springs, OH (US) 34689; Ryan Curtis Dubbs, 322 Locust St., Waterville, OH (US) 43566

( * ) Notice: Subject to any disclaimer, the term of this patent is extended or adjusted under 35 U.S.C. 154(b) by 0 days.

(21) Appl. No.: 11/167,743

(22) Filed: Jun. 28, 2005

(65) Prior Publication Data

US 2006/0096664 A1     May 11, 2006

Related U.S. Application Data

(60) Provisional application No. 60/626,095, filed on Nov. 8, 2004.

(51) Int. Cl.
*A01G 23/06* (2006.01)
(52) U.S. Cl. ..................... 144/24.12; 144/218
(58) Field of Classification Search .............. 144/24.12, 144/334, 4.1, 218; 37/302
See application file for complete search history.

(56) References Cited

U.S. PATENT DOCUMENTS 3,568,740 A * 3/1971 Speakman ............... 144/24.12
3,620,271 A * 11/1971 Loyer ......................... 144/334
4,690,183 A * 9/1987 Eilertson ................. 144/24.12
5,203,388 A * 4/1993 Bowling .................. 144/24.12
5,289,859 A * 3/1994 Minton et al. ............ 144/24.12
5,829,497 A * 11/1998 Maroney ................. 144/24.12
7,011,124 B1 * 3/2006 Morey ......................... 144/334

* cited by examiner

*Primary Examiner*—Shelley Self
(74) *Attorney, Agent, or Firm*—Dennis G. LaPointe (57) ABSTRACT

A self-propelled stump cutting apparatus which also functions as a tow-behind type, resultant of a telescoping tongue hitch. The apparatus is narrowed in width, while in work mode with tow wheels suspended above ground by removing the detachable tow wheel assemblies. Self-propulsion is accomplished by the employment of a unique, retractable, hydraulically motivated tractor axle assembly. This assembly is located on a hinged sub-frame attached to the apparatus main frame. The tractor axle assembly is forcibly positioned and locked by way of a mechanical assembly which is motivated by the vertical movement of the hydraulically maneuvered cutting wheel boom. A major additional feature is the novel direct coupling of the cutting wheel driving hydraulic motor to the cutting wheel axle shaft. This is accomplished by the employment of a compact, self-aligning internal shaft coupling which eliminates commonly used costly and inefficient belt drive systems.

21 Claims, 6 Drawing Sheets

SELF-PROPELLED/TOW-BEHIND, VARIABLE WIDTH STUMP CUTTING MACHINE

RELATED APPLICATION

This application claims the benefit of U.S. Provisional Patent Application 60/626,095 filed Nov. 8, 2004.

BACKGROUND OF THE INVENTION

This invention generally pertains to motorized tree stump cutting or grinding devices. Most of these devices are either towed or trailered behind a standard commercial vehicle. Most towed-behind devices are positioned for work by the tow vehicle. Such an arrangement performs well for easy access tree stumps but is not practical in more difficult, tight access applications. The trailer-mounted devices are commonly self-propelled and more compact for tight maneuvering. Their compactness and general high center of gravity make them unstable for high speed towing, hence trailering is a must.

These two general types of stump cutters almost all feature a rotating cutting wheel mounted on a boom which is swept from side to side, and up and down by either manual or hydraulic enhanced force. Typically, the cutting wheel-boom assembly is attached to an elongated main frame with a gasoline or diesel engine providing the necessary power.

It becomes apparent that both of these types of stump cutters have inherent advantages and disadvantages. Hence, it follows that a hybrid device that incorporates said advantages and eliminates said disadvantages would prove to be optimal and therefore superior.

As to the general rules or types cited there are two notable exceptions. First, the variable width, self-propelled stump cutter U.S. Pat. No. 4,690,183 issued to D. Eilertson on Sep. 1, 1987. Due to a high center of gravity this device requires a trailer. Width varies from narrow for tight maneuvering to wider to stabilize the device for the stump cutting function. The second is the variable width device U.S. Pat. No. 5,289,859 issued to J. Minton Jr. and J. Barr on Mar. 1, 1994. This device requires no trailer and is capable of variable width. The method utilized to vary width does not remove the device's weight from the tow wheels during transition. It relies on hydro-mechanical force to accomplish transition. This practice is less than optimal when durability, weight and cost consideration are made. Although these devices display advantages they both are less than optimal overall and are lacking several other advanced features.

As a result, it is concluded that the most desirable stump cutting device would be a hybrid of the two most common types available. Again, those are the tow-behind with wide track and extendable tongue and the self-propelled narrow track type. The hybrid must be variable width and self-propelled. Other advantages featured would include a fixed level mounted engine, enclosed machinery housing and ride-on capability to mention just a few.

SUMMARY OF THE INVENTION

The invention; an economical, variable width, extendable tongue, self-propelled stump cutter is capable of being deployed in nearly all situations. These broadened parameters are accomplished primarily due to a unique, advanced carriage. Additionally, the invention features a hydraulically driven cutting wheel, a sheet metal machinery enclosure with an integral top mounted tote tray/hot air ducting system and running board for ride-on capability.

The carriage consists of a main frame with a plurality of subassemblies attached. The main frame comprised by square tubing arranged to be run longitudinally to a transverse header with two tangentially mounted tubes attached for use as stub axle receptacles. Directly attached to the primary structural members of the main frame are cylinder mounts, jack or strut mount, boom pivot boss and tractor axle frame position locks and hinges.

The first subassembly is comprised of the hydraulically motivated boom with a pivoting member, the knuckle, at one end and the hydraulically driven cutting wheel at the other. Undercarriage mounted, tandem hydraulic cylinders pivot the boom assembly from side to side. Up and down movement of the assembly is accomplished by a single hydraulic cylinder linked between the knuckle and the boom.

Next is the unique pivoting tractor axle subassembly. This arrangement consists of a tractor axle with drive wheels and a chain drive linked to a hydraulic motor. The axle and motor are carried by a trussed sub-frame that is hinged to the underside of the main frame. This sub frame is locked in either the up or the down position while being towed or down while in the self-propelled work mode. Locking is accomplished by lever actuated links with pins that engage cleated plates fixed to the main frame. Up and down motivation is provided by a lever controlled bracket that links the tractor subassembly to the boom. Very economically, the up and down movement of the boom is utilized to raise and lower the entire machine via the tractor axle subassembly.

An experienced operator can make the transition from tow mode to work mode very quickly. This is to say that this device features not only high mobility, but rapid deployment also.

The two stub axles for towing and stability are the next subassemblies. These assemblies consist of tubular members that are connected by hitch pins to the tangential receptacles on the main frame. The projecting ends of these members are fitted with the necessary wheels, spindles, hubs and fenders. When the tractor axle is lowered, the stub axle assemblies are raised beyond ground contact. Should a narrow track be desired, it is a simple matter to manually remove the hitch pin and telescope away the stub axles. Once the stub axle assemblies are detached, the overall width of the device is dramatically narrowed. Thus, the invention is a very economical, variable width, hybrid stump cutter. Note: The device has an inherent, relatively low center of gravity. Still, the narrow mode of operation is only utilized when necessary.

Another subassembly is the machine housing. This is comprised of a light structural frame, engine, oil pump with drive, oil and gas tanks, battery and hydraulic controls. All of these components are enclosed by a sheet metal body with an integral tote tray/heat duct top. The enclosure functions to keep the bulk of the device clean and out of harms way. It also makes for an attractive appearance and provides a very significant surface area for advertising.

Still another subassembly is the ride-on platform or running board. It is positioned on the side of the main frame behind the equipment housing convenient to the tractor axle direction and speed controls. It is also convenient to the steering tiller. This is an asset to the device that further contributes to the promise of rapid deployment and withdraws. The time saved here tends to negate the need for excessively large engines and their additional weight.

This improved stump cutting machine also features a unique hydraulic system. Almost all prior art utilizes hydraulic pumps, motors and cylinders in association with electric or mechanical clutches which are expensive and tend to pose reliability problems. The presented device is simplified by the use of two uncommon values.

The first is the flow priority valve which divides the pumps output into two circuits. The low pressure circuit is prioritized thereby boom cylinder speeds are constant regardless of engine speed.

The secondary circuit is dedicated to the driving of the cutting wheel and the tractor motor. Speed of the tractor motor is adjusted by a flow control valve. It features varying high pressures and flows that are relative to engine output, minus power required by the priority circuit that is fixed at all times.

These unique conditions enable the application of a simple in/out type flow selector valve to function as a clutch. This design provides a simple, low cost, reliable means of power transmission previously unknown to prior art.

In conclusion the invention is a rapid deploying, light, economical, variable width, tow behind, self-propelled stump cutter with ride-on capability and provisions for tool and material carrying that is unique and highly advantageous in virtually all considerations.

DETAILED DESCRIPTION OF THE INVENTION

Figure 1:
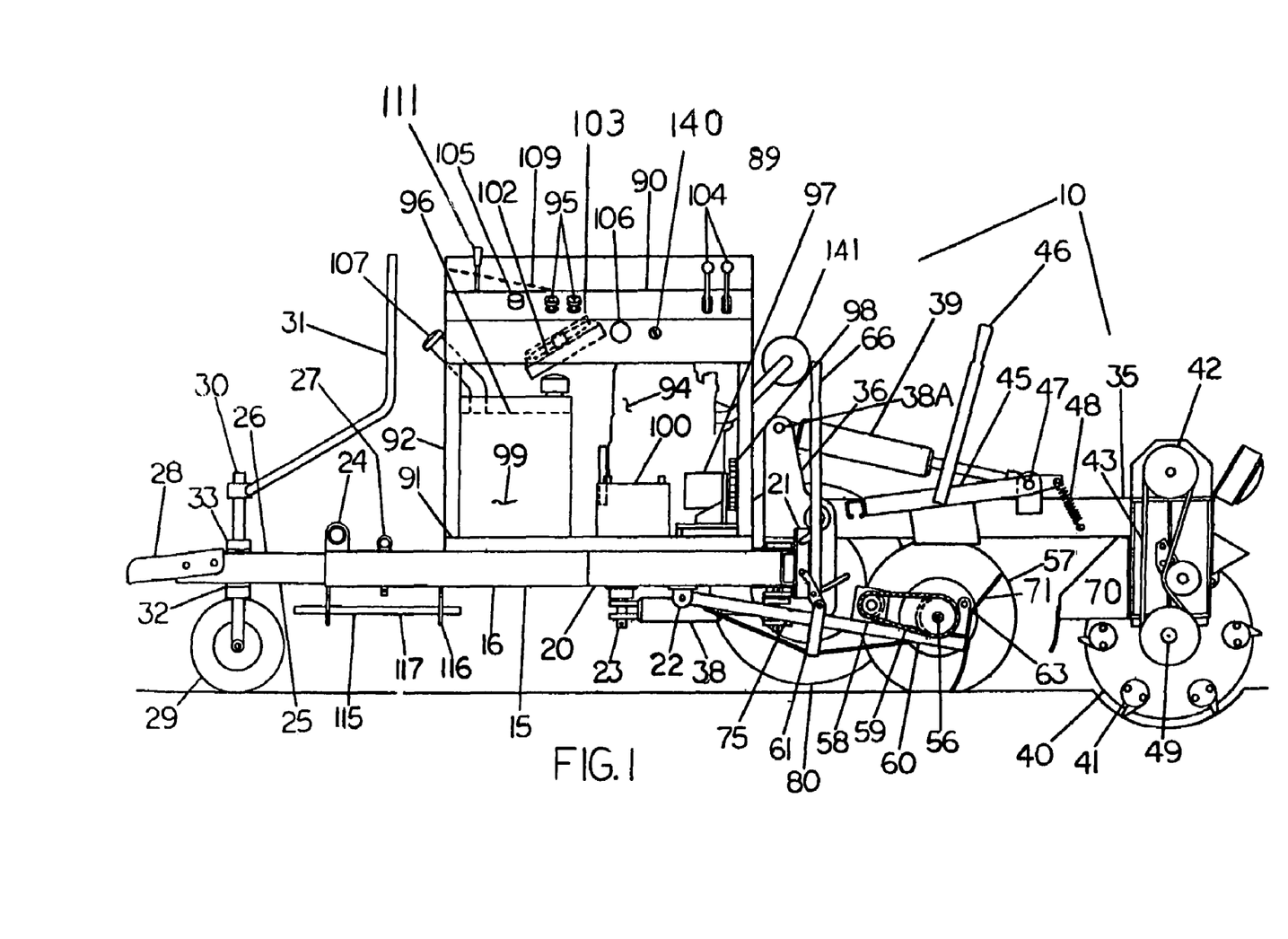
FIG. 1 is a side view of a stump cutting machine in work mode and in accordance with the present invention. Note, belt guard, facing wheels and equipment housing side door is removed for clarity.
Figure 2:
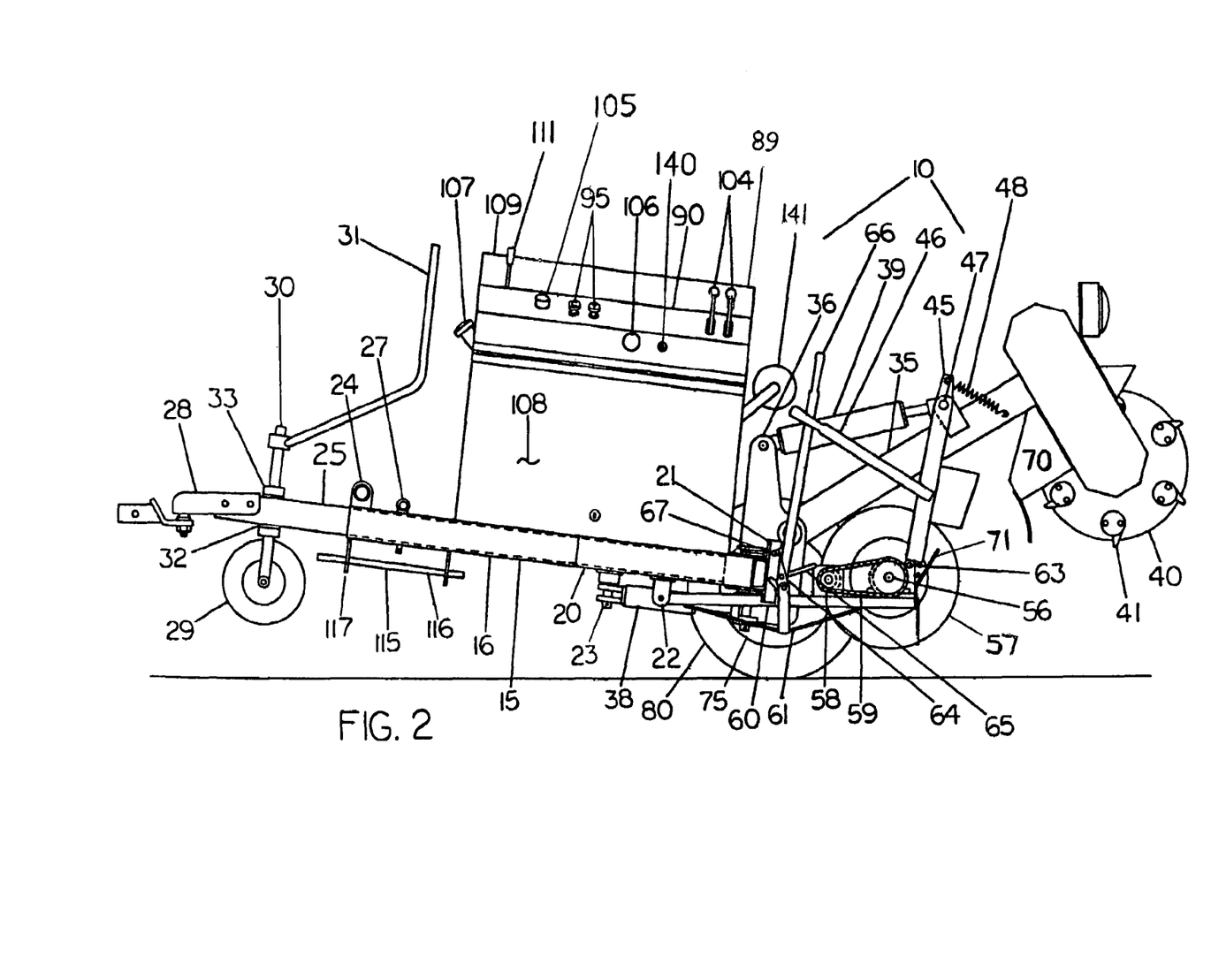
FIG. 2 is a side view of the stump cutting machine of FIG. 1 showing said machine in a tow mode.
Figure 3:
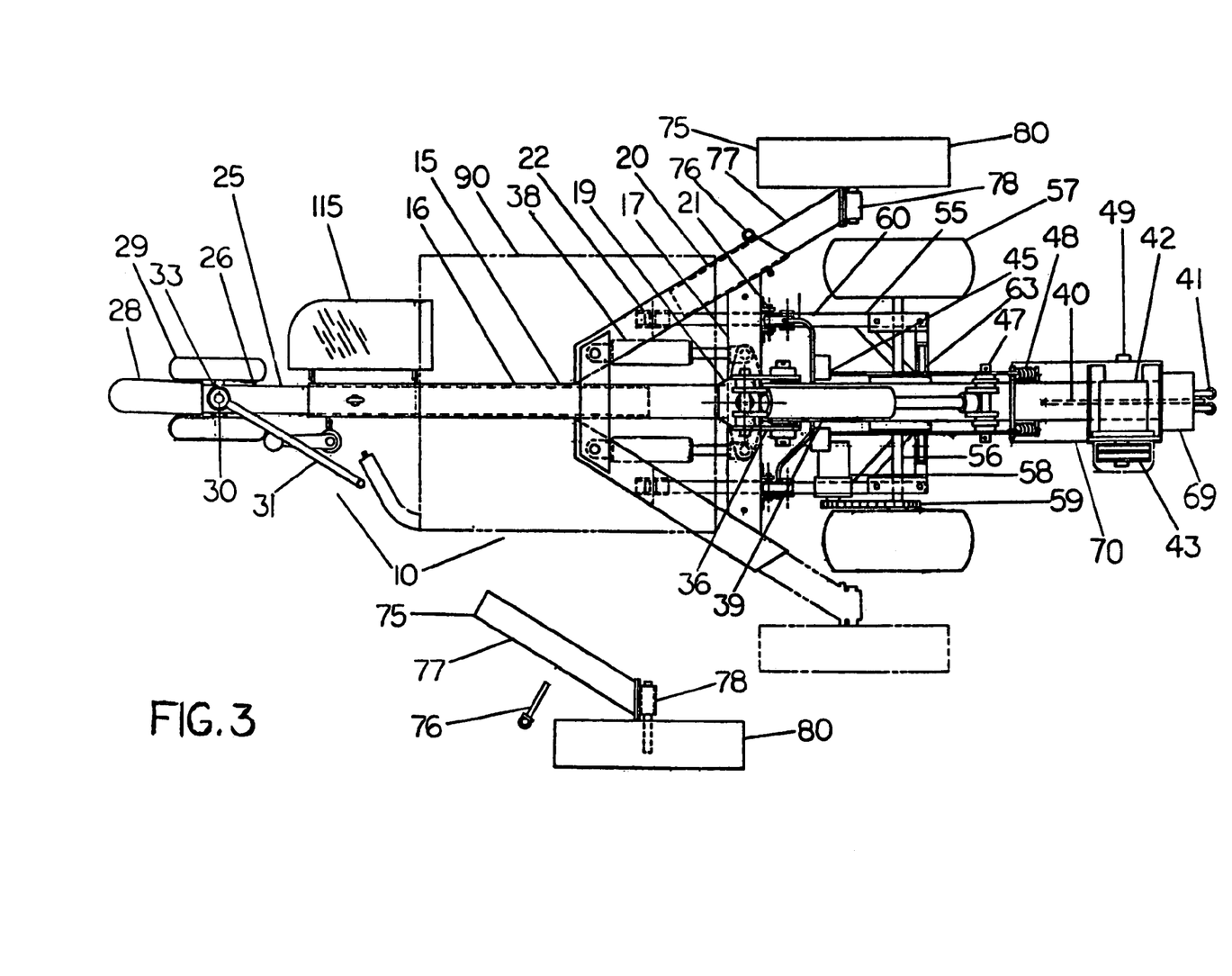
FIG. 3 is a plan view of the stump cutting machine of FIG. 1 in the work mode.

FIGS. 1, 2 and 3 illustrate an improved stump grinding machine 10 posing a general image of the presented invention. This device is composed of a main frame 15 and a plurality of sub-assemblies:

A. main frame assembly 15
B. telescoping tongue assembly 25
C. boom and cutting wheel assembly 35
D. pivoting tractor axle and frame assembly 55
E. towing wheels and stub axle and assemblies 75
F. machine housing assembly 90
G. ride-on platform 115
H. hydraulic system 125

The following detailed description is categorized to insure clarity to anyone of ordinary skill.

A. The main frame assembly 15 is constructed of square metallic tubing with various plate brackets and gussets attached. It also has a round pivot boss 18 for the boom with cutting wheel assembly attachment and round cylinder attachment pins 23. A single main rail 16 runs longitudinally low on the machine 10 to a transverse header 17. At this junction a boom pivot boss is fitted 18. Top and bottom reinforcement gussets 19 are employed at this critical juncture. The transverse header 17 runs laterally equidistant to a pair of tangential frame rails 20 that are receptacles for the stub axle wheel assemblies 75. Also, there are double notched lock down brackets 21 attached to the transverse header for locking the pivoting tractor axle and frame assembly 50 into the desired position. Additionally, attached to the main frame assembly 15 there are the pivot brackets 22 that hinge the pivoting tractor axle and frame assembly 55. Also, there are the cylinder mounts 23 that secure the tandem cylinders 38 and the jack or strut mount 24 used in storage and hitching if required by the operator.

B. The telescoping tongue assembly 25 consists of an elongated tubular member 26 that telescopically recesses into the main frame rail 16. A series of holes in the tongue rail 26 allows for a hitch pin 27 to be removed enabling the machine 10 to, by utilization of tractor axle assembly 55, to perform as a common tow-behind stump cutter. The tractor motor is now engaged to extend and contract the machine 10 via the telescoping tongue assembly 25. This aspect also allows for the removal of the tongue assembly 25 thereby greatly reducing the storage space requirements when the machine 10 is not in use. The tongue assembly 25 also has a hitch receptacle 28 and a steering device. The steering device features two dolly wheels 29 for minimal settlement in soft ground. The elongated tongue rail 26 also employs a steering shaft 30 with a tiller 31 that passes through it at the steering boss 32. Two collars 33 are used to position the steering shaft 30 vertically.

C. The boom and cutting wheel assembly 35 has a two axes 36a and 36b found within doubly hinged member 36 at one end of the boom rail 37. The double hinged member is pivoted from side to side by low lying tandem hydraulic cylinders 38 with one end attached to cylinder mounts 23 and the other end attached to the double hinged member. At pivot pin 38a the boom is raised and lowered by a single longitudinally placed hydraulic cylinder 39. This cylinder is placed between the double hinged member 36 and the boom rail 37. At the distal end of the boom is a cutting wheel axle shaft 49 mounting the cutting wheel 40 with a plurality of cutting teeth 41 placed around its periphery. The cutting wheel 40 is driven by a cutting wheel hydraulic motor 42 by way of a belt or a chain drive arrangement 43. A chain or belt tensioning device 44 is also provided.

Figure 6:
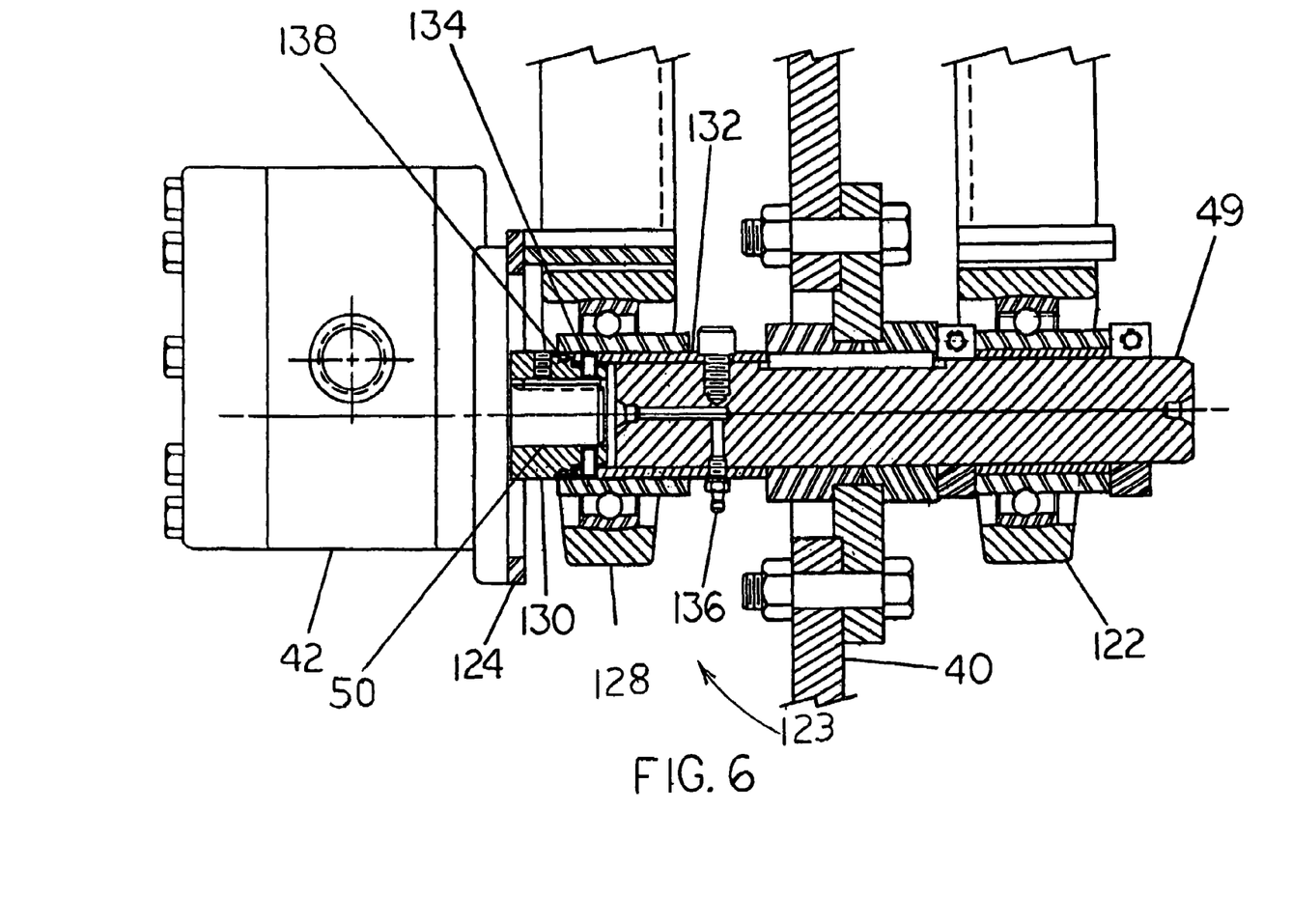
FIG. 6 is a sectional view of the direct cutting wheel drive with a self-aligning coupling.

FIG. 6: It would appear obvious to anyone of ordinary skill that it would be advantageous for the cutting wheel to be directly driven by the cutting wheel hydraulic motor. This concept has in the past caused problems, some due to power robbing binding that inevitably occurs from even the slightest misalignment between drive and driven components. Self-aligning couplings are commercially available but they require extensive spacing that is undesirable in this application Our alternative cutting wheel drive 123 features a unique, compact, direct drive coupling that is capable smoothly transmitting power even while a slight miss-alignment condition exists.

The cutting wheel shaft 49 is positioned by pillow block bearings 128 and 122. The cutting wheel hydraulic motor 42 is positioned by motor mount 124. These two elements are carefully positioned for the best possible alignment and then locked in place mechanically by bolts and welds as required. Any remaining minor miss-alignment is compensated for by our unique coupling.

This coupling features a drive hub 130 connected to the hydraulic motor output shaft 50 connecting to drive shaft sleeve 132 is fitted over and attached to the cutting wheel drive shaft 49. The immediary link is established by a plurality of loosely fitted drive pins 134 which are critical. A pronounced, generous clearance is provided between the drive hub 130 and drive shaft sleeve 132 in relation to themselves and the drive pins 134 and their respective receptacles as drilled through hub 130 and sleeve 132. These clearances allow the loosely fitted drive pins 134 slight movements in rotation without the occurrence of power robbing binding or stress related failure. Diametric travel of the loosely fitted drive pins 134 is restricted inwardly by the motor shaft 50 and outwardly by the inner race of bearing 128. The design is easily modified by employment of a second undrilled sleeve and a repositioned bearing. Lubrication is admitted through grease fitting 136. Over lubricating of the coupling is utilized to force remnants of wear causing dirt from its internal area. An o-ring 138, of the resilient, elastomeric type seal is employed to retain grease and exclude dirt, thereby providing an effective life extending seal.

The overall result of this drive arrangement provides lower costs, reduced maintenance, and increased mechanical efficiency.

FIG. 1: Additional to the boom and cutting wheel assembly is the half fender 70 that is attached to the boom side projections 69 and it serves to retain wood chips and debris produced by the cutting wheel in an area directly behind the cutting wheel. The resulting debris is still further restrained by a chip shield 71 that is attached to the pivoting tractor axle frame 60. These two components, the half fender 70 and the chip shield 71 work together to keep the resulting debris in a consolidated area and thereby reducing clean-up time.

Figure 4:
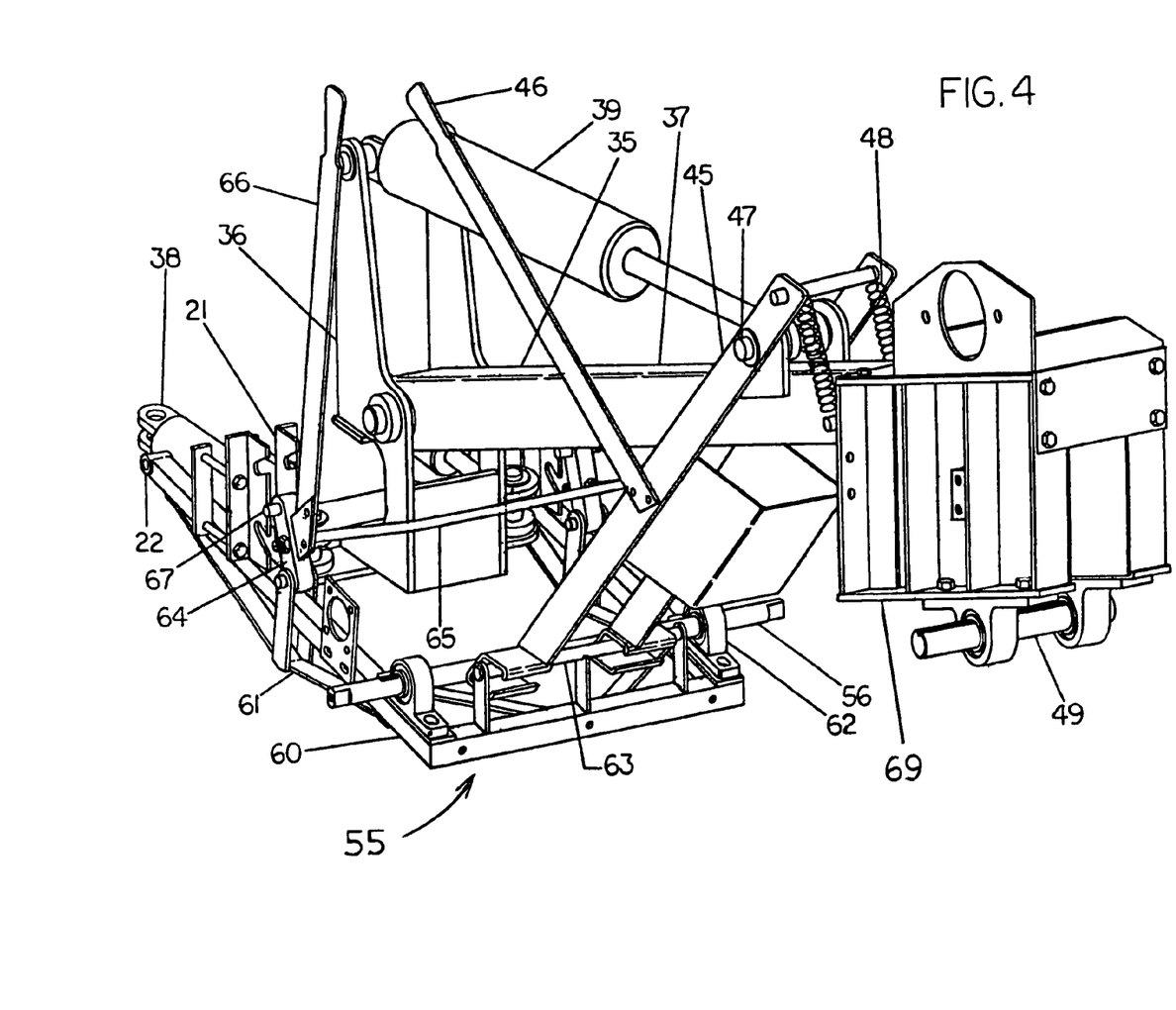
FIG. 4 is an isometric view showing the components of the raising and lowering mechanism of the stump cutting machine of FIG. 1.

D. FIG. 4: Essential to the machine 10 is the final element of the boom assembly. This is the grabber bracket 45 and attached manual actuating lever 46. This member is pivoted to link the hydraulic force of the boom assembly 35 to the pivoting tractor axle assembly 55. The grabber bracket is pivoted 47 on the boom and when not in use, is held tight to the boom by grabber bracket return springs 48. Hence, highly economical and reliable raising and lowering of the machine 10 is achieved.

The pivoting tractor axle and frame assembly 55 consists of a live axle 56 with two tractor wheels 57 and a hydraulic drive motor 58 and chain or belt drive 59. It is obvious that some type of differential to optimize traction and cornering may be added to this assembly. These drive components share a common pivoting frame. The sub-frame is trussed for strength 61 and has bearings 62 for positioning the axle 56. The pivoting tractor axle and frame assembly is hingedly mounted to the underside of the main frame at pivot brackets 22.

This tractor axle frame assembly also has two other unique components. One is the grabber bar 63 for engagement with grabber bracket 45 to enable the raising and lowering of the tractor axle and frame assembly 55 and thereby the machine 10. This is accomplished by utilizing the expansion and contraction of boom cylinder 39.

The other unique component of the machine raising and lowering system is comprised of the dog links 64, connected by tie rod 65 and the dog link actuating lever 66. These dog links are simultaneously maneuvered in and out of the lock down brackets 21 by the lever 66. The dog links engage the brackets via fitted pins 67. It is important to note, that while the machine is being towed from job to job, the grabber bracket 45 is pressured against the grabber bar while the pivoting tractor axle and frame assembly 55 is locked in the up position. Thereby, the boom and cutting wheel assembly 35 is held rigid and cannot sag to the ground.

E. The two, mirrored image stub axle and tow wheel 75 assemblies are telescopically mounted to the tangential frame rails 20 and are fixed in place by hitch pins 76. These assemblies consist of square tube stub axles 77 with spindles 78, hubs 79 and tow wheels 80. They also carry fenders 81 with mounting brackets 82, not shown. Note, these assemblies, like the tongue assembly 25 may be removed to allow compact storage of the machine. In the work mode these wheels are just slightly off the ground but still act as out-riggers allowing a highly stable machine. They are intended to be removed only upon necessity. As previously mentioned, even upon removal of the tow wheel assemblies the machine is more stable than prior art due to its lower center of gravity.

F. FIG. 1, the machine housing 90 is centrally located on the main frame 15 and securely mounted thereto. This housing, at present, utilizes a structural steel base 91 with an additional steel upper frame 92 supporting a sheet metal body 93. It is obvious to anyone of ordinary skill that all or part of the frame may be eliminated by a more elaborate formation of the sheet metal body. Additional to the body there is a large, internal sheet metal angle to allow for the internal mounting of several hydraulic valves (not shown). Other components located within the machine housing 90 include the engine 94, engine controls 95, fuel tank 96, hydraulic pump 97, with belt or chain drive 98, oil reservoir 99 and the battery 100. Also, within the machine housing are a considerable number of hydraulic hoses and their required fittings (not shown). Additionally, enclosed is an oil cooler 102 located adjacent to the cooling fan 103.

Protruding from the machine housing are the engine exhaust pipes 141, cylinder control levers 104, cutting wheel control knob 106, tractor motor directional control valve lever 111 and fuel tank filler spout 107. This housing is easily accessible by two hinged sides or doors 108. The top assembly is very unique in that it not only protects the aforementioned components but provides a ducted heat ventilation portal 109 and a very useful tool tray 89 also.

G. The ride-on platform 115 is a small, simple assembly mechanically fastened to the side main frame longitudinal rail 16. It consists of two L-shaped brackets 116 and a small, flat platform 117 suitable for one standing individual. This assembly greatly reduces deployment and withdrawal times. However, it is only optional due to safety and insurance considerations.

Figure 5:
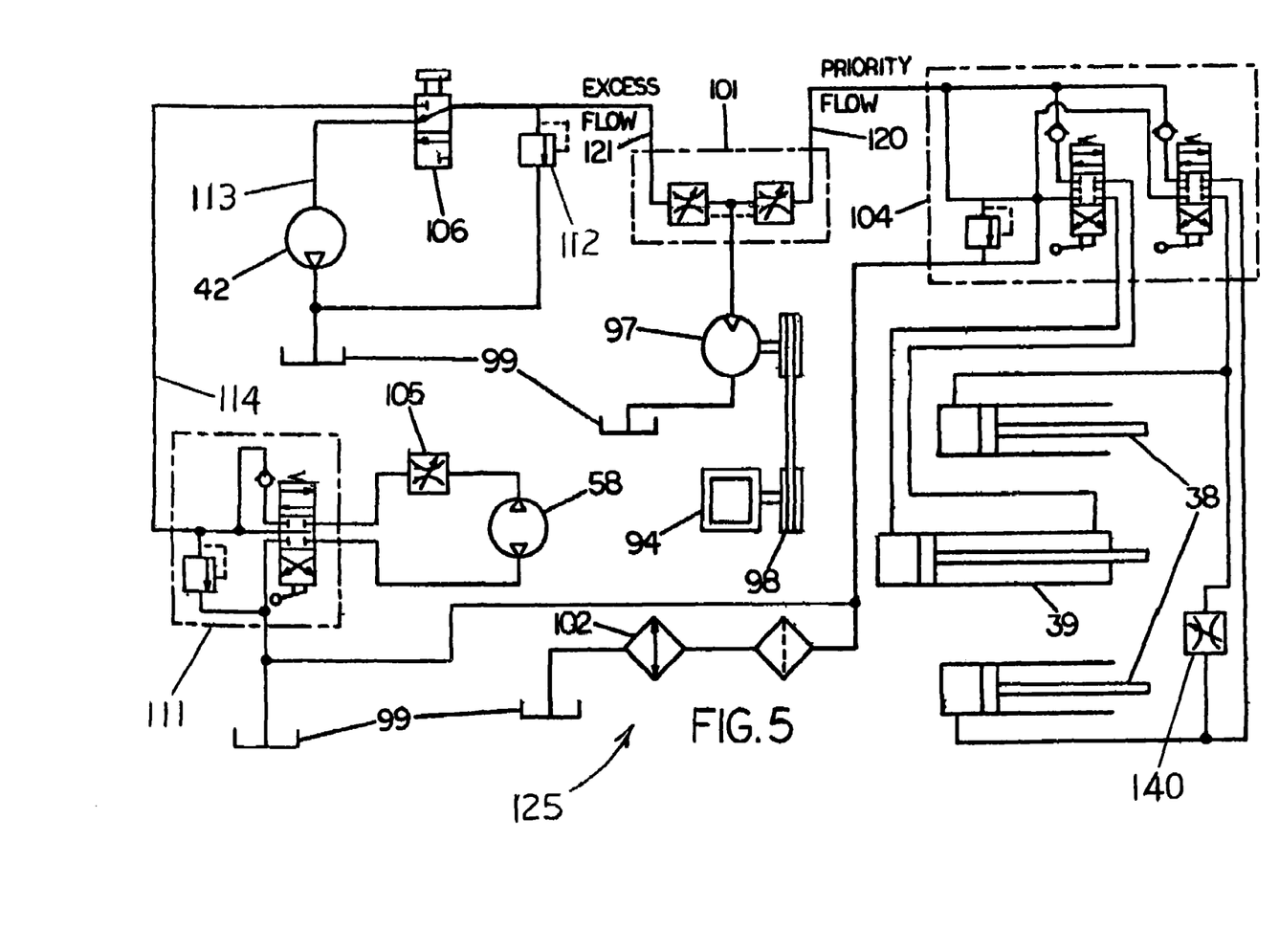
FIG. 5 is a block diagram of the hydraulic system utilized by the stump cutting machine of FIG. 1.

H. FIG. 5, the hydraulic system 125 of this stump cutting device is also innovative and unique. It is powered by the engine 94 via a belt or chain drive 98 or the like driving a pump 97. It is obvious that a manipulation of the various components in the machine housing would enable direct coupling of the engine 94 to the pump 97 but this is not preferred because of balancing and accessibility problems.

The hydraulic system is of accepted practice in that it utilizes a reservoir 99 and a pump 97. A unique feature follows the pump that pressurizes the fluid. The fluid is routed through a priority flow control valve 101 that divides it into priority flow circuit 120 and an excess flow 121 circuit. The low pressure circuit is the priority circuit and it feeds the manipulating cylinders 38, 39. The result is smooth consistent movement of the cutting wheel via the boom. Lateral moving speed of boom is controlled by flow control valve 140.

The excess flow circuit 121 is utilized to drive either the cutting wheel motor 42 or the tractor wheels hydraulic wheel motor 58. A basic flow selector valve 106 controls which hydraulic motor receives the pressure. This arrangement permits a highly efficient drive system due to the elimination of unnecessary pressure loss. This system also provides very rapid stopping of the cutting wheel and the total elimination of accidental tractoring engagement during the cutting process. Also, an oil cooler 102 is provided to maintain optimal fluid temperatures and allow the machine 10 to operate under the harshest of conditions.

OPERATION

To maintain a clear presentation of the operation of this invention it is believed best to simply describe a single tree stump removal cycle. It is as follows:

1) The operator starts the engine 94 and while it warms-up, the trailer lights and hitch is disconnected allowing the dolly wheels 29 to be placed on the ground.
2) Using the conveniently located hydraulic controls the boom cylinder 39 lifts the boom assembly 35 to unlock the tractor axle assembly 55. Note, at this time the grabber bracket 45 and grabber bar 63 are engaged with the tractor axle assembly locked in the up position to prevent accidental lowering and boom assembly 35 sagging while in tow. The boom is raised slightly to disengage the link pins 67. The link pins are manipulated by the lever 66. Once these are free the boom is lowered, thereby lowering the tractor axle assembly. When the tractor wheels are grounded the boom will slowly raise the tow wheel slightly off the ground. When the desired height is achieved, the boom is reversed and the link pins 67 are maneuvered into their up position dog slots. The grabber mechanism is now disengaged and as it is spring 48 loaded it will tuck tight against the bottom of the boom.
4) Hydraulic controls now engage the tractor motor 42 and, with dolly wheels 29 and steering tiller 31, the machine is driven to the target tree stump. Should the machine be challenged by tight quarters, the stub axle and tow wheel assemblies are simply removed. It is at the discretion of the operator as to whether extra stability is required. Note: Irregular terrain has caused many roll-overs with previously accepted devices.
4) Upon reaching the stump, it is commuted by increasing power, engaging the cutting wheel 40 and using the knuckle 36, boom 37 and cylinders to manipulate it as required. The tractor motor advances the cutter as necessary. When the cutting is completed the process is simply reversed, placing the device back upon the tow vehicle hitch.

What is claimed is:

1. A stump cutting apparatus having a wheel supported carriage for a motorized tool, said apparatus comprising:
    a rigid main frame for operatively mounting a motorized tool, said rigid main frame comprising a single main rail intersecting a transverse header, said transverse header and said single main rail being in respective mechanical communication with two opposing structural members extending along sides of said apparatus and forming a generally A-shaped frame portion with said transverse header at the end of which are wheel axle means for mounting free-wheeling wheels for transporting said apparatus, an apex portion of said generally formed A-shaped frame portion being attached to said single main rail, and free-wheeling wheels mounted to said wheel axle means;
    means for towing said apparatus being provided at an end of said single main rail, said means for towing including a tow vehicle tongue and hitch receptacle assembly,
    a double hinged boom assembly mounted to said rigid main frame near an end of said single main rail opposite to that of said means for towing said apparatus, said double hinged boom assembly having a distally located, rotating cutting wheel having a plurality of radially extending cutting teeth circumferentially attached to the periphery of said cutting wheel,
    wheel means in mechanical communication with said single main rail for steering and maneuvering said apparatus, said wheel means being in an underlying relationship to said single main rail and said means for towing said apparatus;
    self-propulsion driven wheel means for urging or tractoring said apparatus forward and backward, said self-propulsion driven wheel means being in mechanical communication with and in an underlying relationship with said boom assembly;
    said boom assembly further comprising means for raising and lowering said self-propulsion driven wheel means for facilitating a transfer of a principal weight of said apparatus to and from said free-wheeling wheels for transporting said apparatus and said self-propulsion driven wheel means.

2. The stump cutting apparatus as defined in claim 1, wherein said single main rail is telescopic in length and said free wheeling wheels for transporting said apparatus have respective removable stub axles assemblies.

3. The stump cutting apparatus as defined in claim 1, wherein said self-propulsion driven wheel means is connected by a rotational energy element to a tractor wheel axle which is positioned by bearings on a pivoting frame which is hingedly attached to the said rigid main frame to enable the apparatus to make a transition from a towing mode of operation to a working mode of operation.

4. The stump cutting apparatus as defined in claim 3, wherein said self-propulsion driven wheel means are rotationally urged by a hydraulic motor through a rotational energy connecting element positioned on said pivoting tractor axle and frame assembly hingedly attached to a bottom of said rigid main frame.

5. The stump cutting apparatus as recited in claim 1, wherein said boom assembly is double hinge mounted to said rigid main frame by a joining double hinge member to provide lateral and vertical movement of said boom assembly, said apparatus further comprising at least one hydraulic cylinder in mechanical communication with and in an underlying relationship with said rigid main frame in a space saving arrangement so as to provide a means for urging a movement of said boom assembly wherein an uncluttered area above said rigid main frame is provided for a machine housing and machine elements placed therein.

6. The stump cutting apparatus as defined in claim 5, wherein said double hinged member is pivotally attached to said rigid main frame at an intersection of said single main rail and said transverse header and is employed to laterally urge said boom assembly by a valve controlled hydraulic cylinder, said valve controlled hydraulic cylinder being in mechanical communication with and in an underlying relationship with said rigid main frame,
    wherein a vertical movement of the said boom assembly is achieved by said valve controlled hydraulic cylinder mounted above said boom assembly, and attached to said boom assembly at one end and attached to the vertically extended sides of said double hinged member at the other end.

7. The apparatus as defined in claim 6, wherein said valve controlled hydraulic cylinder is urged by a stable, consistent pressure and flow rate as a result of an application of a priority flow control valve in mechanical communication with an engine driven hydraulic pump mounted at a desired location to said rigid main frame, thereby dividing pressure and flow of said engine driven hydraulic pump output into a stable, consistent cylinder maneuvering low pressure, low flow priority circuit and a remaining high pressure and high flow into a secondary circuit which is utilized to hydraulically urge either a cutting wheel hydraulic motor or a tractor axle hydraulic motor by means of a selector valve which switches the flow between said cutting wheel hydraulic motor and said tractor axle hydraulic motor.

8. The stump cutting apparatus as recited in claim 5, wherein the means for urging said movement of said boom assembly is additionally utilized to raise and lower a retractable tractor axle and frame assembly by mechanical means comprised of a lever actuated, pivotally attached gabber bracket which is pivotally mounted to said boom assembly so as to provide a retractable link to said pivoting tractor axle and frame assembly thereby enabling the vertical movement of said boom assembly to forcibly raise and lower said retractable tractor axle and frame assembly thereby transforming said apparatus from a free wheeling tow mode to said self-propelled work mode, with a second lever actuated dog link means pivotally attached to the retractable tractor axle and frame assembly for alternately engaging one side of a double notched lock down bracket which is attached to said main frame transverse header thereby locking said retractable tractor axle and frame assembly in a raised or lowered position, which, while in the work mode, allows said grabber bracket assembly to be positioned against the bottom of the boom assembly thereby providing unobstructed movement of the boom assembly while said apparatus is in the work, self-propelled mode of operation.

9. The stump cutting apparatus as recited in claim 3, wherein said apparatus further comprises means for chip collection having an essentially angled flat surface mounted to said retractable tractor axle and frame assembly to further deflect stump debris beneath said apparatus from a half fender positioned behind said boom assembly.

10. The stump cutting apparatus as recited in claim 6, wherein a space saving arrangement of said boom assembly and said valve controlled hydraulic cylinder allows for a centrally located, consolidated machinery equipment housing which contains an engine, at least one hydraulic pump, a hydraulic oil reservoir, a fuel tank, a battery, and means for providing hydraulic control.

11. The stump cutting apparatus as recited in claim 10, wherein said machinery equipment housing further comprises a plurality of portals for venting air, door access means for accessibility to an interior of said housing, and a portion of a top side of said housing being configured to function as a tool and material carrying tray.

12. The stump cutting apparatus according to claim 1, further comprising a hydraulically urged rotational driving motor which is linked directly to a cutting wheel axle shaft by a self-aligning internal shaft coupling, said self-aligning internal shaft coupling having at least one connecting loosely fitted drive pin, floating between a drilled drive hub mounted on an output shaft of said rotational driving motor and a corresponding drilled axle shaft drive sleeve affixed to said cutting wheel axle shaft, with a travel of said loosely fitted drive pin being restricted inwardly by said rotational driving motor output shaft and outwardly retained by an inside diameter of a support and positioning bearing of said cutting wheel axle shaft positioned around the periphery of said loosely fitted drive pin which due to liberal clearances between an outside of said drilled drive hub and an inside of said axle shaft drive sleeve, and similarly, liberal clearances between a diameter of said loosely fitted drive pin and corresponding drilled holes enables a smooth energy transfer from the rotational driving motor and the driven shaft.

13. The stump cutting apparatus as recited in claim 12, wherein said axle shaft drive sleeve that serves as means for retaining said at least one loosely fitted drive pin is formed by the utilization of a through hole in an inner race of a ball or roller bearing to retain said at least one loosely fitted drive pin, thereby providing a means for positioning and supporting said shaft coupling and said cutting wheel axle shaft, while also utilizing said inside diameter of said support and positioning bearing to outwardly retain said at least one loosely fitted drive pin.

14. The stump cutting apparatus as recited in claim 12, wherein said shaft coupling and said cutting wheel axle shaft is fitted with a resilient, elastomeric o-ring, said o-ring serving as a grease and dirt seal which is located between the drive hub and a hollow portion of the driven shaft to prevent internal abrasive contamination and to retain the lubricant that is injected by way of an easily accessible grease fitting located on the driven shaft which is ported in a manner that channels the grease into a formed internal cavity of said self-aligning coupling.

15. A variable width, self-propelled carriage for supporting a motorized tool or apparatus, said carriage comprising:
  a rigid main frame assembly for operatively mounting a motorized tool or apparatus which is mounted thereon, said rigid main frame assembly comprising a single main rail member along a longitudinal axis thereof, said rigid main frame assembly further comprising means for towing said carriage at one end thereof, said means for towing said carriage including a tow vehicle tongue and hitch receptacle assembly, said rigid main frame assembly further having a transverse header at an opposite end thereof from said means for towing said carriage;
  a pair of free-wheeling removable tow wheels and stub axle assemblies telescopically mounted at each side of said rigid main frame assembly of said carriage for supporting said carriage while being towed;
  self-propulsion driven wheel means for urging or tractoring said carriage forward and backward, said self-propulsion driven wheel means being in mechanical communication with a hydraulically urged boom assembly which is attached to said rigid main frame assembly, said self-propulsion driven wheel means being retractable for towing said carriage;
  at least one independent pivoting wheel placed at and in an underlying relationship with said means for towing said end of said carriage to steer or maneuver said carriage, said hydraulically urged boom assembly having a cutting wheel mounted at a distal end of said boom assembly for commuting tree stumps;
  means for attaching said boom assembly to said rigid frame assembly, said means for attaching said boom assembly being a double hinged member, which permits vertical and lateral movement of said boom assembly and said cutting wheel; and
  a hydraulic cylinder arrangement that places at least one cylinder connected to an underside of said carriage at one end and to said double hinged member at the opposite end to provide lateral movement of the boom assembly and cutting wheel with at least one other cylinder positioned above the boom, secured at one end to vertically extended sides of the double hinged member and at the distal end of the boom at the other end to create a means for vertical movement of said boom assembly.

16. A carriage as defined in claim 15, wherein said towing means is telescopically mounted inside said single main rail member of said main frame assembly to enable an elongation of said carriage when a position locking retaining pin is removed.

17. A carriage as defined in claim 15, wherein at least one hydraulically urged self-propulsion wheel is positioned on a pivoting tractor axle and frame assembly hinged mounted to an underside of said rigid frame assembly.

18. A carriage as defined in claim 15, wherein a lever actuated bracket is pivotally mounted to said boom assembly so as to be positioned as a link between said hydraulically urged boom assembly and a retractable tractor axle and frame assembly in a manner that utilizes said hydraulic cylinder arrangement to raise and lower said rigid main frame assembly and said carriage as required to transition said carriage between a free-wheeling tow mode and a self-propelled work mode.

19. A carriage as defined in claim 18, further comprising a second lever for urging at least one mounted pivoting dog link and pin assembly into a predetermined, frame mounted double notched lock down bracket to lock said retractable tractor axle and frame assembly in either the raised or lowered position and thereby enabling said carriage to be placed in either said work mode or said tow mode.

20. A carriage as defined in claim 15, wherein said hydraulic cylinder arrangement is configured to create a space suitable for the placement of a consolidated machinery housing containing an engine, at least one hydraulic pump, a rotational energy transferring means for connecting said engine to said pump, a hydraulic control system, a fuel tank, a hydraulic oil reservoir, and an exterior skin.

21. A carriage as defined in claim 20, wherein a top side of said machinery housing is formed to function as both a control panel and a structural tray for transporting tools and materials.

* * * * *

UNITED STATES PATENT AND TRADEMARK OFFICE
CERTIFICATE OF CORRECTION

PATENT NO. : 7,398,805 B2 Page 1 of 1
APPLICATION NO. : 11/167743
DATED : July 15, 2008
INVENTOR(S) : Donald William Dubbs and Ryan Curtis Dubbs It is certified that error appears in the above-identified patent and that said Letters Patent is hereby corrected as shown below:

Title Page, Item (76) should read as follows:
(76) Inventors: Donald William Dubbs, 1440 Watermill Cir., Tarpon Springs, FL (US) 34689
Ryan Curtis Dubbs, 332 Locust St., Waterville, OH (US) 43566

Signed and Sealed this

Eighteenth Day of November, 2008

JON W. DUDAS
*Director of the United States Patent and Trademark Office*